US012265602B2

(12) United States Patent
Anju et al.

(10) Patent No.: US 12,265,602 B2
(45) Date of Patent: Apr. 1, 2025

(54) AUTHENTICATION OF USERS BASED ON CODES EMBEDDED IN MACHINE-READABLE ITEMS

(71) Applicant: Microsoft Technology Licensing, LLC, Redmond, WA (US)

(72) Inventors: Anju, Kirkland, WA (US); Ehud Mordechai Itshaki, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 226 days.

(21) Appl. No.: 17/870,589

(22) Filed: Jul. 21, 2022

(65) Prior Publication Data

US 2024/0028684 A1    Jan. 25, 2024

(51) Int. Cl.
*G06F 21/00* (2013.01)
*G06F 21/33* (2013.01)
*G06F 21/62* (2013.01)

(52) U.S. Cl.
CPC .......... *G06F 21/33* (2013.01); *G06F 21/6218* (2013.01)

(58) Field of Classification Search
CPC ...... G06F 21/33; G06F 21/6218; G06F 21/36; H04L 9/3213; H04L 9/3263; H04L 63/0823; H04W 12/069
See application file for complete search history.

(56) References Cited

U.S. PATENT DOCUMENTS

| 2003/0110401 | A1* | 6/2003 | Aoshima | H04L 63/0838 726/7 |
|---|---|---|---|---|
| 2007/0136589 | A1 | 6/2007 | Magdi | |
| 2017/0324729 | A1* | 11/2017 | Hon | H04L 63/083 |
| 2019/0296913 | A1 | 9/2019 | Verma et al. | |
| 2021/0334352 | A1* | 10/2021 | Wu | G06F 21/43 |

OTHER PUBLICATIONS

Grassi, et al., "Digital Identity Guidelines", In Proceedings of National Institute of Standards and Technology, Jun. 2017, 75 Pages.
Grassi, et al., "Digital Identity Guidelines", Retrieved From: https://pages.nist.gov/800-63-3/sp800-63b.html, Jun. 2017, 48 Pages.
"International Search Report and Written Opinion Issued in PCT Application No. PCT/US23/024501", Mailed Date: Sep. 28, 2023, 11 Pages.

* cited by examiner

*Primary Examiner* — Joseph P Hirl
*Assistant Examiner* — Chi D Nguy (57) ABSTRACT

According to examples, an apparatus includes a processor that is to obtain a plurality of codes contained in a machine-readable item and send a request for authentication of a user of the machine-readable item to a server. The server is to select a certain code of a plurality of certain codes and return a request for the selected certain code. The processor is to receive the request for the selected certain code from the server and to identify a code in the plurality of codes that corresponds to the selected certain code. The processor is also to send the identified code to the server for the server to authenticate the user based at least on the identified code. In addition, the processor is to receive an indication as to whether the authentication request of the user is successful from the server.

20 Claims, 7 Drawing Sheets

|       | 300        | CODE 304 |
|-------|------------|----------|
| LABEL 302 — 1 | AS2F2F@D — | |
| 2     | ASO@DPSO   |          |
| 3     | 89E!DPS9   |          |
| ⋮     |            |          |
| N     | 89E!DPS9   |          |

*FIG. 3A*

| ROW 312 | COLUMN 314 | 310 | CODE 304 | |
|---|---|---|---|---|
|   | A | B | ... | M |
| 1 | AS2F2F@D | JDHEF32D |  | 827DUCJS |
| 2 | ASO@DPSO | HDYE71@D |  | CIDH239D |
| 3 | 89E!DPS9 | YWUD1*DC |  | POEISKCD |
| ⋮ | ⋮ | ⋮ | ⋮ | ⋮ |
| N | 736!DKSU | OSIEU2C9 |  | WUDYH28C |

AUTHENTICATION OF USERS BASED ON CODES EMBEDDED IN MACHINE-READABLE ITEMS

BACKGROUND

A terminal, such as a computing device, a cash register, a handheld scanning device, or the like, may execute an application that may require that a user be authenticated prior to the user being granted access to the terminal. Particularly, for instance, the application may receive credentials from the user that are used to authenticate the identity of the user. The credentials include, for instance, a user identification, a user password, and the like. In addition, the user may provide the credentials through an interface of the terminal such as a keyboard, a mouse, and/or other type of input mechanism.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on. In the addition, the use of the terms "first," "second," "third," etc., are not intended to denote a specific order of elements, but instead are intended to distinguish the elements with respect to each other.

Users who mainly access information on computing devices to perform tasks, e.g., information workers, often have any of a number of relatively simple and secure processes for being authenticated. Authentication processes are considered to be relatively simple when, for instance, users are not required to enter user credentials that are difficult to remember. Examples of user credentials that users often find difficult to remember are usernames and passwords having sufficient complexities to prevent them from being easily compromised. In addition to being difficult to remember, memorized passwords are often undesirable because the passwords often provide a relatively low level of security due to the relative ease with which hackers may steal or crack passwords.

Relatively simple and secure authentication processes may be authentication processes that may not require that users manually enter their user names and/or passwords, but instead, rely on other secure techniques. These authentication processes include, for instance, the use of an authenticator application on the user's smartphone, the use of one-time codes obtained through email or SMS text messages, the use of hardware token devices, etc. Information workers often have ready access to these types of authentication processes as they normally have access to personal or employee-provided smartphones and/or hardware token devices. In addition, information workers normally use devices that are not shared among multiple users and thus, are assigned to them personally. As a result, certain authentication information, such as biometric information, are normally stored locally on the devices.

Unlike information workers, certain types of users, such as frontline workers, are often required to physically use certain terminals, such as computing devices, point of sale devices, inventory tracking devices, etc., that are shared among multiple users to perform their tasks. These types of users are often required to move between and/or log onto the terminals multiple times during the day and thus, they are authenticated multiple times a day. In order to maintain certain security levels, some organizations do not permit these types of users to use their personal devices at work. In addition, in order to reduce costs, the organizations do not provide the users with company phones or hardware token devices. As a result, these types of users are often left with the use of usernames and passwords to be authenticated. A technical issue associated with the use of usernames and passwords, however, is that they often do not provide a desired level of protection and thus, create security risks to an organization. Additionally, entry of the usernames and passwords by the users are often difficult on certain types of devices, such as point of sale devices. In some environments, the users wear protective gear, such as gloves, which makes it even more difficult for the users to enter their credentials to be authenticated.

Disclosed herein are apparatuses, systems, and computer-readable mediums that enable relatively simple and secure authentication of users through use of codes embedded in machine-readable items. Particularly, a processor obtains a plurality of codes contained in, e.g., embedded in or stored in, a machine-readable item that is assigned to or otherwise owned by a user. In some examples, the machine-readable item is a machine-readable code, such as a quick response (QR) code, a bar code, or the like, and the processor is to obtain the plurality of codes from a captured image of the machine-readable code. In other examples, the machine-readable item is a data storage device on which the codes are stored and the processor is to obtain the plurality of codes through a communication with the machine-readable item. The communication is to be made, for instance, through use of a communication with the machine-readable code that uses a near-field communication protocol, a radio frequency identification communication, or the like.

The processor is to send a request for authentication of the user of the machine-readable item to a server that is to determine whether the user is authentic and thus should or should not be authorized to access an apparatus, such as a shared terminal. The processor is to send an identifier of the user and/or the machine-readable item, which the processor has obtained from the machine-readable item, to the server with the request. However, the processor is not to send the codes that the processor obtained from the machine-readable item to the server. Instead, the server is to select one of the codes that the processor is to provide to the server, in which the server is to use the selected one of the codes in making the authentication determination. That is, the server has access to a plurality of certain codes that, in instances in which the machine-readable item includes a valid set of codes, match the codes included in the machine-readable item.

The server is to select an identifier, e.g., a label, of one of the codes and to send a request to the processor to provide the server with the code that matches the identifier of the selected code. The server is to determine that the user is authentic based at least on a determination that the code provided by the processor matches the selected code or to determine that the user has failed authentication based on a determination that the code does not match the selected code. The processor is to also extract a user principal name (UPN) (which may also be a username or other identifier of the user) from the machine-readable item and to send the extracted UPN to the server. The server is to select a certain set of codes corresponding to the user based on the received UPN. The server may further use other authentication information as a second factor in determining whether the user is authentic. The other authentication information may be a personal identification number, a biometric information, a one-time code, and/or the like. In addition, the server is to select a code only once, which enables the use of the codes to be replay resistant as the code is not used more than once.

The processor is to receive an indication as to whether the user has been authenticated and to permit the user to access the apparatus, e.g., an application on the apparatus, based on the indication signaling that the user is authentic. Alternatively, the processor is to block the user from having access to the apparatus based on the indication signaling that the user is inauthentic.

Through implementation of the features of the present disclosure, users are to be authenticated without requiring that the users manually enter their credentials, such as usernames and passwords, through keyboards. Instead, the users are to provide proofs of their identities by establishing that they have proper machine-readable items in their possessions and in some instances, proper secondary authentication information, such as a proper PIN. As a result, users need not memorize complex passwords that may be changed over time in order to access apparatuses. The users also need not manually enter their usernames or passwords as a user principal name may be provided from a machine-readable item. The users are thus granted greater accessibility to the apparatuses and are able to sign into the apparatuses relatively quickly, which may reduce time taken away from users, e.g., employees. In addition, technical improvements afforded through implementation of the features of the present disclosure include security improvements in authenticating users. That is, the users are authenticated through use of codes stored in the machine-readable items as discussed herein, which provides a greater level of security than passwords that are relatively easily compromised. This provides strong authentication while simplifying authentication experiences for users, e.g., employees and students.

Figure 1:
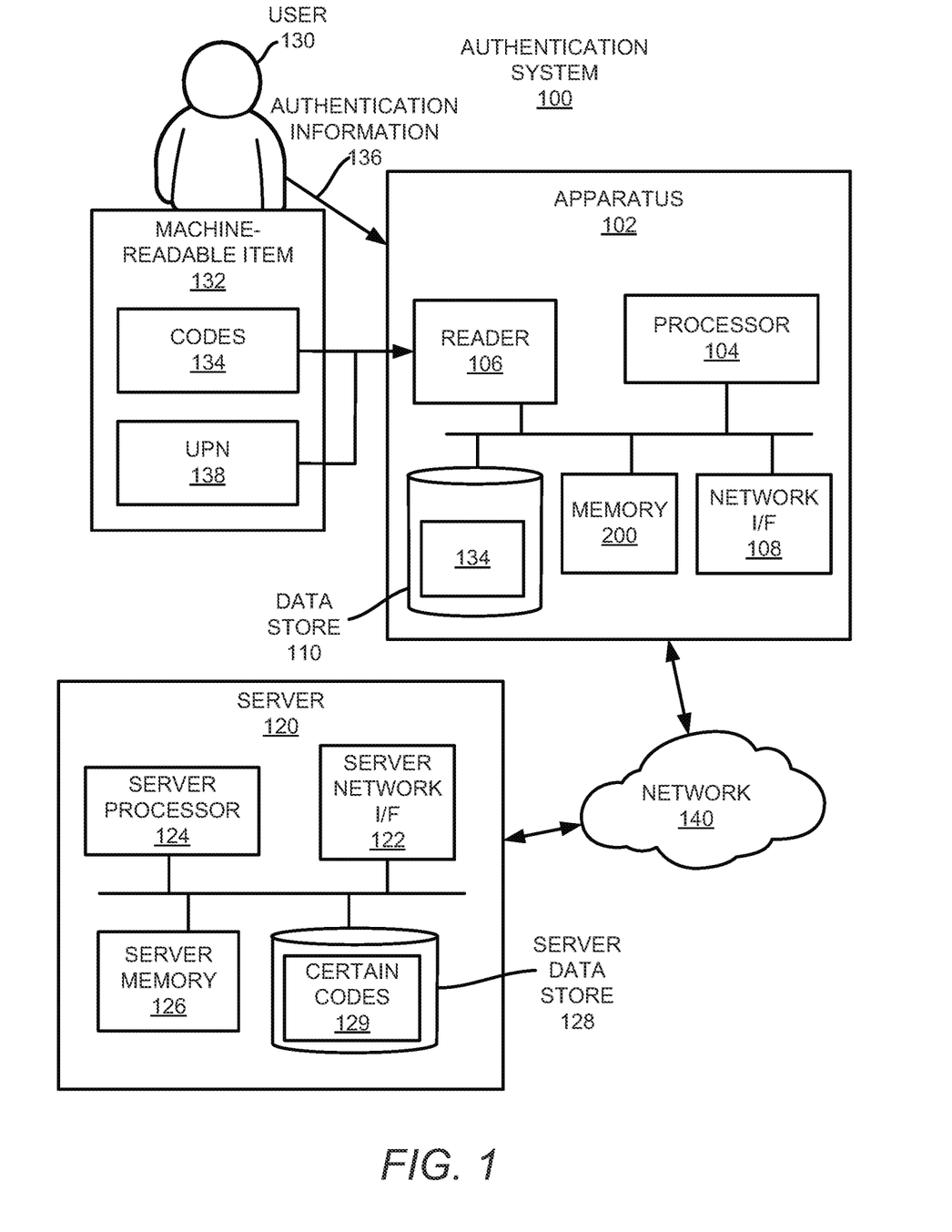
FIG. 1 shows a block diagram of an authentication system, in accordance with an embodiment of the present disclosure.
Figure 2A:
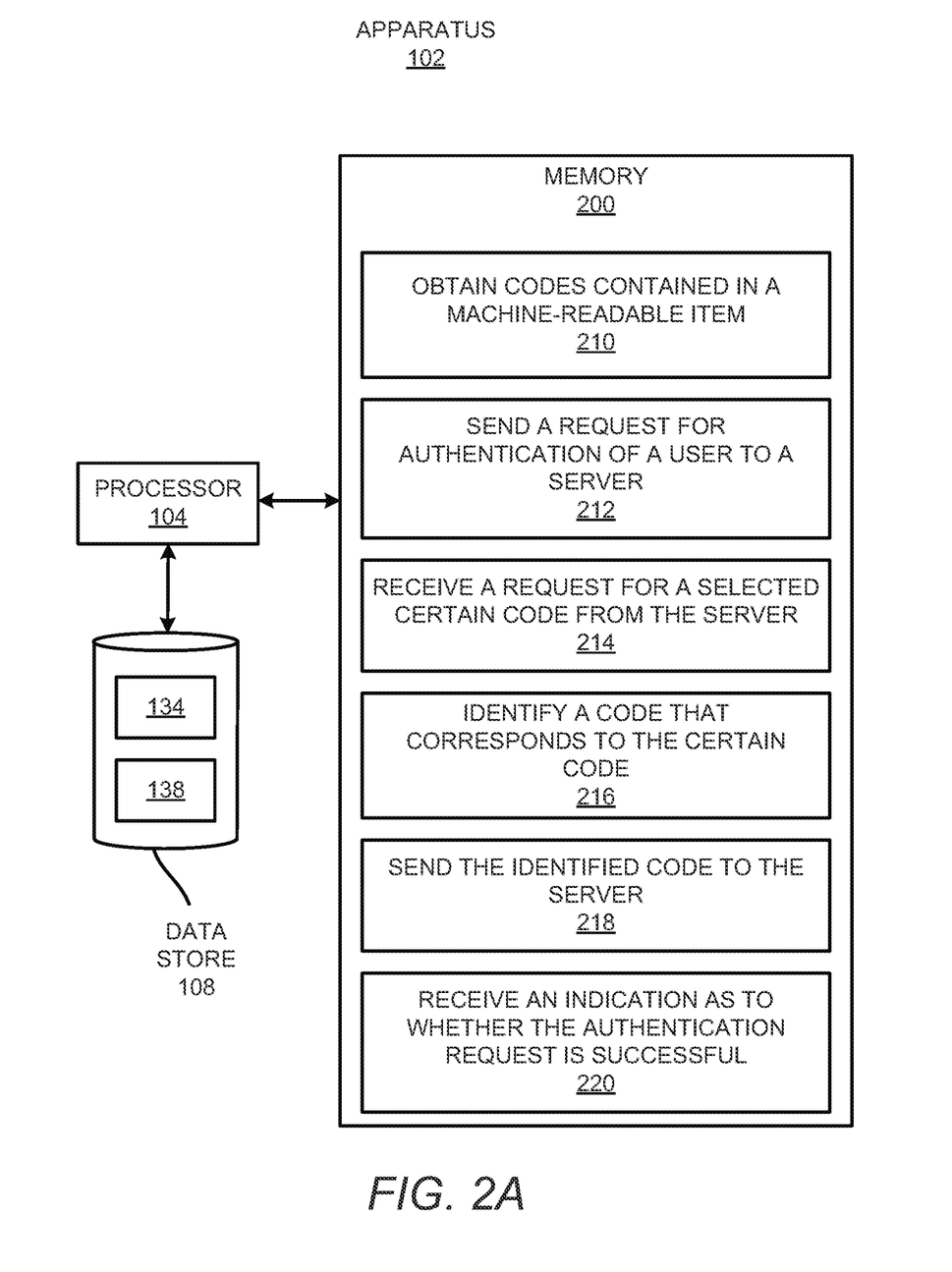
FIGS. 2A and 2B, respectively, depict block diagrams of the apparatus depicted in FIG. 1, in accordance with embodiments of the present disclosure.
Figure 2B:
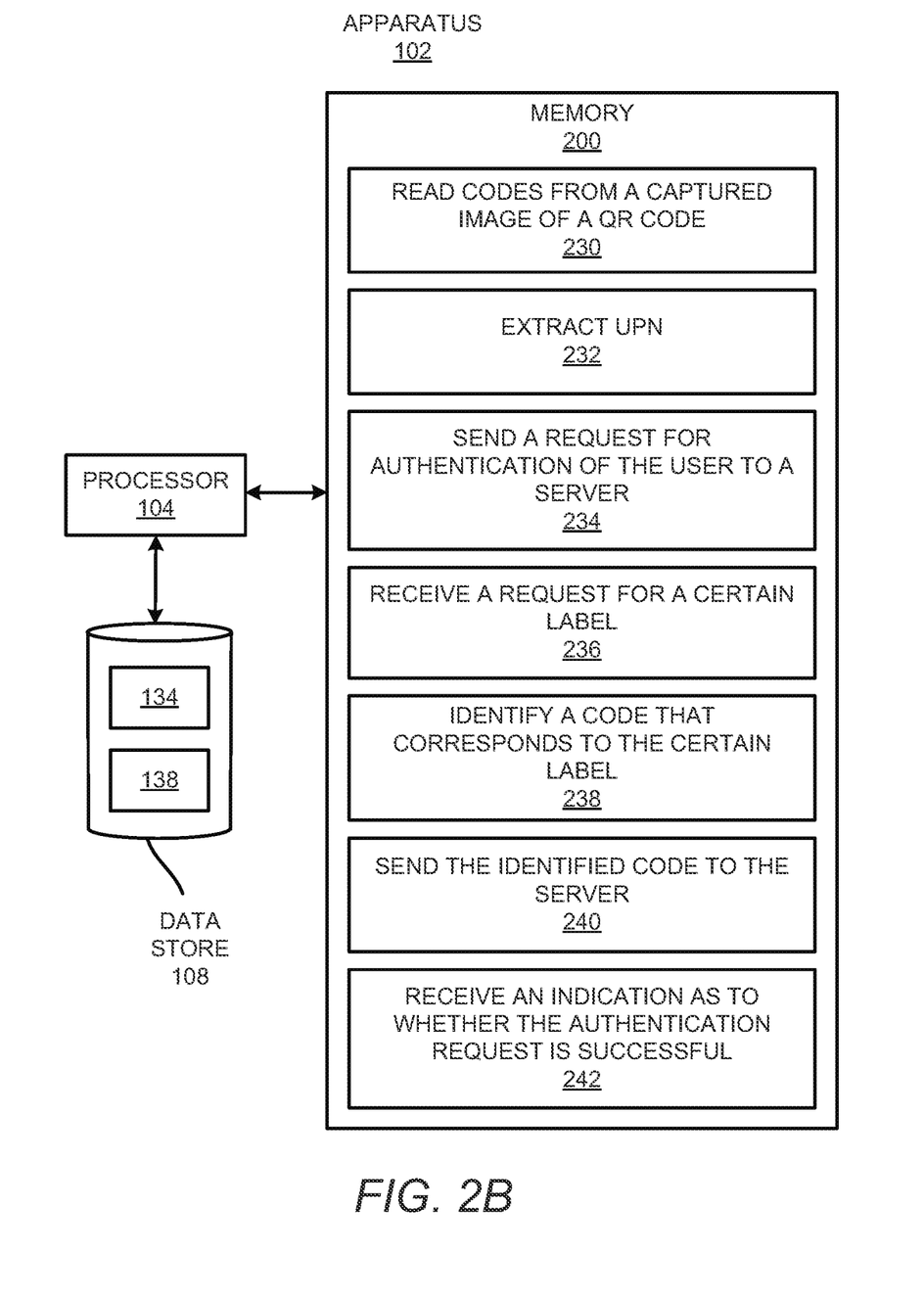

Reference is first made to FIGS. 1, 2A, and 2B. FIG. 1 shows a block diagram of an authentication system 100 in accordance with an embodiment of the present disclosure. FIGS. 2A and 2B, respectively, depict block diagrams of the apparatus 102 depicted in FIG. 1, in accordance with embodiments of the present disclosure. It should be understood that the authentication system 100 and the apparatus 102 of the authentication system 100, in other examples, include additional features and that some of the features described herein may be removed and/or modified without departing from the scopes of the authentication system 100 and/or the apparatus 102.

As shown in FIG. 1, the authentication system 100 includes the apparatus 102 and a server 120 that is to perform authentication services to authenticate users, such as a user 130. Particularly, the user 130 uses a machine-readable item 132 on which a plurality of codes 134 are contained to provide the apparatus 102 with the codes 134. The server 120 uses the codes 134, as well as other authentication information of the user 130 to authenticate, e.g., determine whether the user 130 is authentic. The user 130 may be authenticated, for instance, in order to be granted access to use the apparatus 102 and/or an application running on the apparatus 102.

The apparatus 102 is a computing device, such as a personal computer, a laptop computer, a tablet computer, a smartphone, a computing terminal, a handheld scanning device, or the like. In some examples, the user 130 does not own or have exclusive use of the apparatus 102. Instead, multiple users share the apparatus 102 as may occur, for instance, in an education institution, in a work environment, such as a warehouse, a factory, etc., and/or the like. For instance, the apparatus 102 is a desktop computer in a library, in a classroom, or the like. As other examples, the apparatus 102 is an inventory tracking terminal, a cash register, a computing terminal, etc., that multiple users share at different times, e.g., during different shifts. As a yet further example, the apparatus 102 is a computing terminal in a hospital or other medical facility, such as a device that is used for taking patient readings, storing health records, or the like, that different users access. The user 130 is a full-time employee of an organization, a laboratory technician, a temporary employee of an organization, a guest of an organization, a contractor of a business, a student of an educational institution, and/or the like.

As the apparatus 102 may be shared by multiple users, the apparatus 102 may not store the credentials, such as user identifiers, passwords, biometric information, etc., of the users. The apparatus 102 may not store this information as it may pose security risks, may violate privacy policies, etc. In any of these examples, users are required to provide credentials that are to be authenticated prior to the users accessing the apparatus 102, e.g., prior to accessing and using an application on the apparatus 102. As discussed herein, the users often find it difficult to memorize relatively complex passwords that may change over time. The users also need not manually enter their usernames or passwords. Additionally, the passwords themselves often do not provide relatively high levels of security as the passwords are often relatively easily compromised.

Figure 3A:
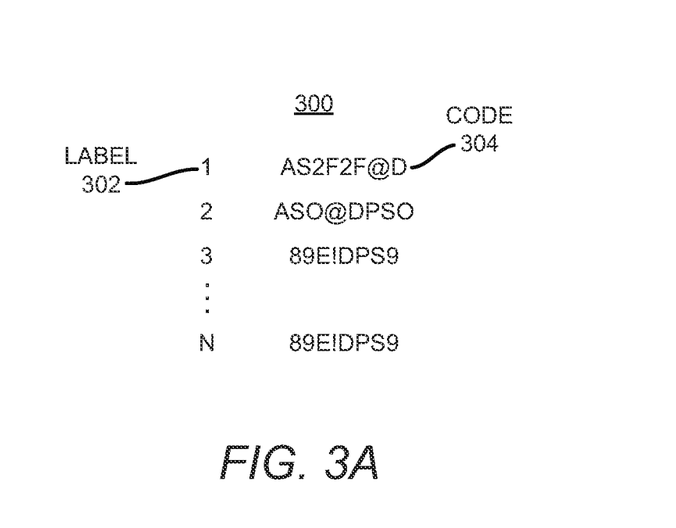
FIGS. 3A and 3B, respectively, depict diagrams of an example listing and a table that includes labels and does, in accordance with embodiments of the present disclosure.

According to examples, the user 130 is provided with, assigned, or owns a machine-readable item 132 that the user 130 is to use to be authenticated to access the apparatus 102 along with at least one other authentication factor as discussed herein. The machine-readable item 132 contains a plurality of codes 134 that the apparatus 102 is to obtain from the machine-readable item 132. Each of the codes in the plurality of codes 134 is individually identifiable and includes respective sets of numbers, characters, letters, binary codes, etc. In some examples, each of the codes 134 is assigned with an individually identifiable label, such as a number, a set of letters, a set of alphanumeric values, etc., that is unique among the codes 134. An example of this type of labeling of the codes 134 is shown in the example listing 300 in FIG. 3A. Particularly, each of the codes 304 in the plurality of codes 134 is assigned with a label 302 that is one of a consecutive set of numbers. In FIG. 3A, the variable "N" represents a value that is greater than one.

Figure 3B:
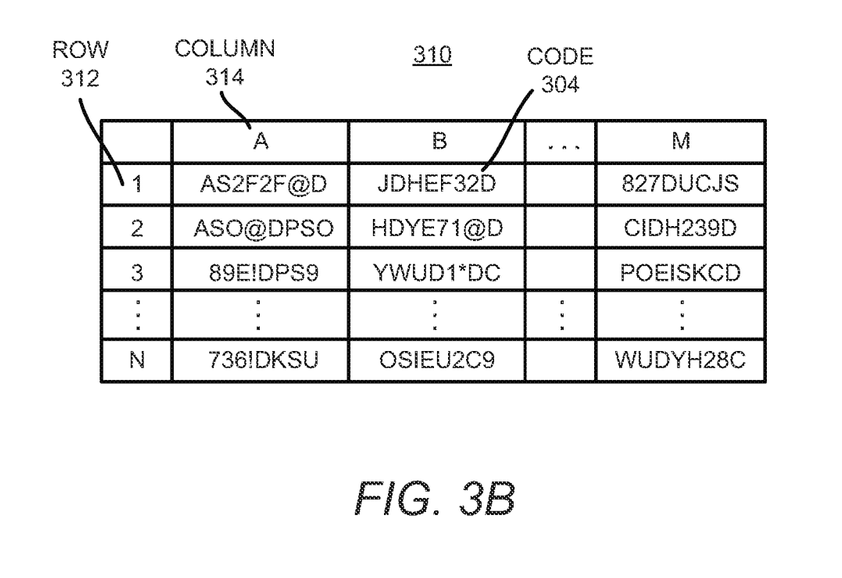

In other examples, the codes 134 are stored in a table, such as in a look up table 310 as shown in FIG. 3B. As shown in FIG. 3B, each of the codes 304 in the plurality of codes 134 is stored in a cell of a table 310, in which each cell is identifiable by a specific row 312 and a specific column 314. In the table 310, the variables "N" and "M" represent values that are each greater than one. The machine-readable item 132 contains hundreds, thousands, or greater, codes 304 in the listing 300 or table 310. Additionally, it should be understood that the codes 134 depicted in FIGS. 3A and 3B are for purposes of illustration and should thus not be construed as limiting the present disclosure to what is shown in those figures.

The machine-readable item 132 is also shows as containing a user principal name (UPN) 138 of the user 130. The UPN 138, which may also be a username of the user, may be a set of characters that may uniquely identify the user 130 among a plurality of users. That is, the UPN 138 is to be uniquely assigned to the user 130.

According to examples, the machine-readable item 132 is a quick response (QR) code, a barcode, and/or the like. In these examples, the machine-readable item 132 is printed onto an identification badge assigned to or owned by the user 130, stored on a smartphone, a smart watch, a laptop, etc., of the user 130, and/or the like. In other examples, the machine-readable item 132 is a data storage device and the plurality of codes 134 and UPN 138 are stored in the data storage device. The data storage device is a smartphone, a smart watch, a laptop, etc., that is to communicate the plurality of codes 134 and the UPN 138 through a wired or a wireless connection with the apparatus 102.

The apparatus 102 is shown in FIGS. 1, 2A, and 2B as including a processor 104 that controls operations of the apparatus 102. The apparatus 102 is also depicted as including a memory 200 on which data that the processor 104 accesses and/or executes are stored. The processor 104 is a semiconductor-based microprocessor, a central processing unit (CPU), an application specific integrated circuit (ASIC), a field-programmable gate array (FPGA), and/or other hardware device. The memory 200, which is also be termed a computer readable medium, is, for example, a Random Access memory (RAM), an Electrically Erasable Programmable Read-Only Memory (EEPROM), a storage device, or the like. In some examples, the memory 200 is a non-transitory computer readable storage medium, where the term "non-transitory" does not encompass transitory propagating signals. In any regard, the memory 200 has stored thereon machine-readable instructions that the processor 104 is to execute.

Although the apparatus 102 is depicted as having a single processor 104, it should be understood that in other examples, the apparatus 102 includes additional processors and/or cores without departing from a scope of the apparatus 102. In this regard, references to a single processor 104 as well as to a single memory 200 should be understood to additionally or alternatively pertain to multiple processors 104 and multiple memories 200. In addition, or alternatively, in some examples, the processor 104 and the memory 200 are integrated into a single component, e.g., an integrated circuit on which both the processor 104 and the memory 200 are provided.

The memory 200 is shown in FIG. 2A as having stored thereon machine-readable instructions 210-220 that the processor 104 is to execute. Although the instructions 210-220 are described herein as being stored on the memory 200 and thus include a set of machine-readable instructions, in some examples, the apparatus 102 includes hardware logic blocks that perform functions similar to the instructions 210-220. In these examples, the processor 104 additionally or alternatively include hardware components that execute the instructions 210-220. In other examples, the apparatus 102 includes a combination of instructions and hardware logic blocks to implement or execute functions corresponding to the instructions 210-220. In any of these examples, the processor 104 implements the hardware logic blocks and/or executes the instructions 210-220. As discussed herein, the apparatus 102 may also include additional instructions and/or hardware logic blocks such that the processor 104 may execute operations in addition to or in place of those discussed herein with respect to FIGS. 2A and 2B.

The processor 104 is to execute the instructions 210 to obtain codes 134 contained in a machine-readable item 132. The processor 104 is to also extract the UPN 138 from the machine-readable item 132. In some examples, the reader 106 is to obtain the codes 134 and the UPN 138 from the machine-readable item 132 when the user 130 places the machine-readable item 132 adjacent to a reader 106. The apparatus 102 includes or is connected to the reader 106, which may obtain, e.g., read, scan, capture an image of, etc., the codes 134 and the UPN 138 from the machine-readable item 132. In some examples, the reader 106 includes a camera that is to capture an image of the machine-readable item 132, e.g., in instances in which the machine-readable item 132 is a machine-readable code, such as a QR code. In these examples, the processor 104 is to access a captured image of the machine-readable item 132 and to extract the codes 134 and the UPN 138 from the captured image of the machine-readable item 132. By extracting the UPN 138 from the machine-readable item 132, the user 130 need not manually enter the user's 130 user name, email address, or the like, which may save the user 130 time and effort.

In addition or in other examples, the reader 106 includes a communication device that communicates with a machine-readable item 132 on which the codes 134 are stored. For instance, the reader 106 includes an RFID tag reader that is to obtain the codes 134 and the UPN 138 wirelessly from the machine-readable item 132. In other examples, the reader 106 includes a device that communicates with the machine-readable item 132 in other manners, such as through a near field communication connection, a Bluetooth connection, or the like. In any of these examples, the processor 104 is to obtain the plurality of codes 134 and the UPN 138 from the machine-readable item 132 through a communication with the machine-readable item 132. In any of the examples above, the processor 104 is to store the codes 134 and the UPN 138 in a data store 110.

The processor 104 is to execute the instructions 212 to send a request for authentication of the user 130 of the machine-readable item 132 to the server 120. In some examples, the processor 104 sends the request without sending any of the codes 134 that the processor 104 obtained from the machine-readable item 132. However, the processor 104 is to include the UPN 138 in the request sent to the server 120. The processor 104 is to send the request out of the apparatus 102 and to a network 140 through a network interface 108, which may be hardware and/or software that may facilitate communications through the network 140. The network 140 is any suitable type of network through which the processor 104 may communicate with the server 120, such as the Internet, a wide area network, a local area network, or the like.

The server 120 is shown in FIG. 1 as including a server network interface 122 through which the server 120 is to receive the request from the apparatus 102. The server 120 is also depicted as including a server processor 124 and a server memory 126. The server processor 124 is any type of processor as discussed above with respect to the processor 104 and the server memory 126 is similar to the types of memories discussed above with respect to the memory 200. The server 120 is also depicted as including a server data store 128 on which a plurality of certain codes 129 is stored. The server memory 126 may have stored thereon instructions that cause the server processor 124 to determine whether the user 130 is authentic.

According to examples, the certain codes 129 are the same as the codes 134 contained in the machine-readable item 132. That is, for instance, the server processor 124, or another processor, may have created the certain codes 129 and may have assigned the labels 302, which may be identifying numbers, rows 312 and columns 314, etc., to the certain codes 129 as discussed herein. That is, the certain codes 129 have been assigned the same labels 302 as the codes 134 in the machine-readable item 132.

In addition, the certain codes 129 are encoded into or stored into the machine-readable item 132 along with an indication of the correspondence between the certain codes 129 and the machine-readable item 132. In some examples, the correspondence between the machine-readable item 132 and the certain codes 129 are also stored in the server data store 128. For instance, the machine-readable item 132 has been assigned an identifier such as a serial number and/or the user 130 has been assigned a user principal name (UPN), or the like. In some examples, the server processor 124 stores a plurality of sets of certain codes 129, in which each of the sets of certain codes 129 is assigned to a different machine-readable item, e.g., to a different user.

In some examples, the request received from the processor 104 includes an identification of the machine-readable item 132, e.g., a serial number, and/or the user 130, e.g., the UPN 138, to which the machine-readable item 132 is assigned. The processor 104 is to identify the set of certain codes 129 that corresponds to the identification of the machine-readable item 132 and/or the user 130 stored in the server data store 128. In addition, the processor 104 is to select a certain code of a plurality of certain codes 129 and to return a request for the selected certain code to the apparatus 102. Particularly, the processor 104 is to select one of the certain codes that has not previously been selected. In this regard, the processor 104 is to track which of the certain codes have previously been selected and to not select those certain codes again for use in authenticating the user 130. As a result, the codes 134 may not be used again in a replay attack. The processor 104 may also select the certain code according to a certain selection algorithm, randomly, etc.

The processor 104 is to execute the instructions 214 to receive a request for a selected certain code 129 from the server 120. The request may include an identification of the label 302 of a particular code corresponding to the selected certain code 129. As discussed herein, the selected certain code 129 may be unique as it may not have previously been used before for the user 130. The processor 104 is to execute the instructions 216 to identify a code 304 in the plurality of codes 134 that corresponds to the selected certain code 129. Particularly, the processor 104 is to determine which code 304 in the plurality of codes 134 is assigned the same label 302 as the label assigned to the selected certain code 129.

The processor 104 is to also execute the instructions 218 to send the identified code to the server 120 for the server 120 to authenticate the user 130 based at least on the identified code. That is, after receiving the identified code from the processor 104, the server processor 124 is to compare the code returned by the processor 104 against the certain code stored in the server data store 128 having the same label 302. The server processor 124 is to determine that the user 130 is inauthentic based on a determination that the code received from the processor 104 does not match the certain code having the same label 302 stored in the server data store 128. In contrast, the server processor 124 is to determine that the user 130 and/or the machine-readable item 132 is authentic based at least on a determination that the code received from the processor 104 matches the certain code having the same label 302 stored in the server data store 128. In other examples, the server processor 124 may use other authentication information to also make this determination. These examples are discussed in greater detail herein.

The server processor 124 is to send an indication as to whether the authentication request is successful. That is, the server processor 124 is to send an indication that the authentication request is successful, e.g., that the user 130 is authenticated, based on a determination that the authentication request is successful. Alternatively, the server processor 124 is to send an indication that the authentication request in unsuccessful, e.g., that the user 130 has not been authenticated, based on a determination that the authentication request is unsuccessful.

The processor 104 is to also execute the instructions 220 to receive an indication as to whether the authentication request of the user 130 is successful from the server 120. Based on the authentication request being indicated as being unsuccessful, the processor 104 is to block access by the user 130 to the apparatus 102, e.g., is to block access to one or more applications on the apparatus 102. However, based on the authentication request being indicated as being successful, the processor 104 is to permit the user 130 to access the apparatus 102, e.g., access one or more applications on the apparatus 102. For instance, the server processor 124 may provide the processor 104 with a key that the server 120 may use to enable the user 130 to access the apparatus 102.

The memory 200 is shown in FIG. 2B as having stored thereon machine-readable instructions 230-242 that the processor 104 is to execute. The instructions are a set of machine-readable instructions, hardware logic blocks, or a combination thereof. The apparatus 102 may also include additional instructions and/or hardware logic blocks such that the processor 104 may execute operations in addition to or in place of those discussed herein with respect to FIG. 2B.

The processor 104 is to execute the instructions 230 to read codes 134 from a captured image of a QR code, e.g., the machine-readable item 132. The processor 104 is to execute the instructions 232 to extract the UPN 138 of the user 130 from the captured image of the QR code. In some examples, the processor 104 is to also obtain authentication information 136, which is additional information that the user 130 is to provide to the apparatus 102 to enable the server 120 to authenticate the user 130. For instance, the authentication information 136 is information that the user 130 may provide for the server processor 124 to use in performing a multifactor authentication of the user 130. The authentication information 136 is, for instance, a personal identification number (such as a 4 digit or a 6 digit number), biometric information of the user 130, a one-time code (such as a code that the user 130 has received on the user's 130 smartphone as a text message or an email message), a combination thereof, or the like. The user 130 may provide the authentication information 136 through, for instance, a keyboard, the reader 106, and/or the like.

The processor 104 is to execute the instructions 234 to send a request for authentication of the user 130 to the server 120. In some examples, the processor 104 is to send the request without sending any of the codes 134 that the processor 104 obtained from the QR code 132. In addition, the processor 104 is to send an identifier of the machine-readable item 132 and/or the user 130, e.g., the UPN 138, with the request. In some examples, the processor 104 sends the authentication information 136 with the request.

The processor 104 is to execute the instructions 236 to receive a request for a certain label 302 from the server 120. As discussed herein, the server processor 124 is to select a certain code 129 from a set of codes 129 as a code that was not previously selected for the user 130. The processor 124 is also to select the set of codes 129 from the UPN 138 of the user 130. The certain label 302 may be the label for the selected certain code 129. In addition, the server processor 124 is to send the request for the certain label 302 to the processor 104. In some examples, the server processor 124 is to determine whether the authentication information 136 matches authentication information that was previously stored in the server data store 128. For instance, the user 130 may have previously provided the authentication information 136 to the server 120 and the server 120 may have stored the authentication information 136 in the server data store 128. The server processor 124 may have also stored a correlation between the authentication information 136 and an identifier of the user 130 and/or the machine-readable item 132. In some examples, the server processor 124 is to select the certain code 129 based on a determination that the authentication information 136 matches the authentication information for the user 130 stored in the server data store 128. In this regard, the server processor 124 may avoid wasting the usage of the certain codes 129.

The processor 104 is to execute the instructions 238 to identify a code 304 that corresponds to the certain label 302. That is, for instance, the processor 104 is to identify the code 304 that has been assigned the certain label 302. In addition, the processor 104 is to execute the instructions 240 to send the identified code 304 to the server 120. Moreover, the processor 104 is to execute the instructions 242 to receive an indication from the server 120 as to whether the authentication request of the user 130 is successful.

Figure 4:
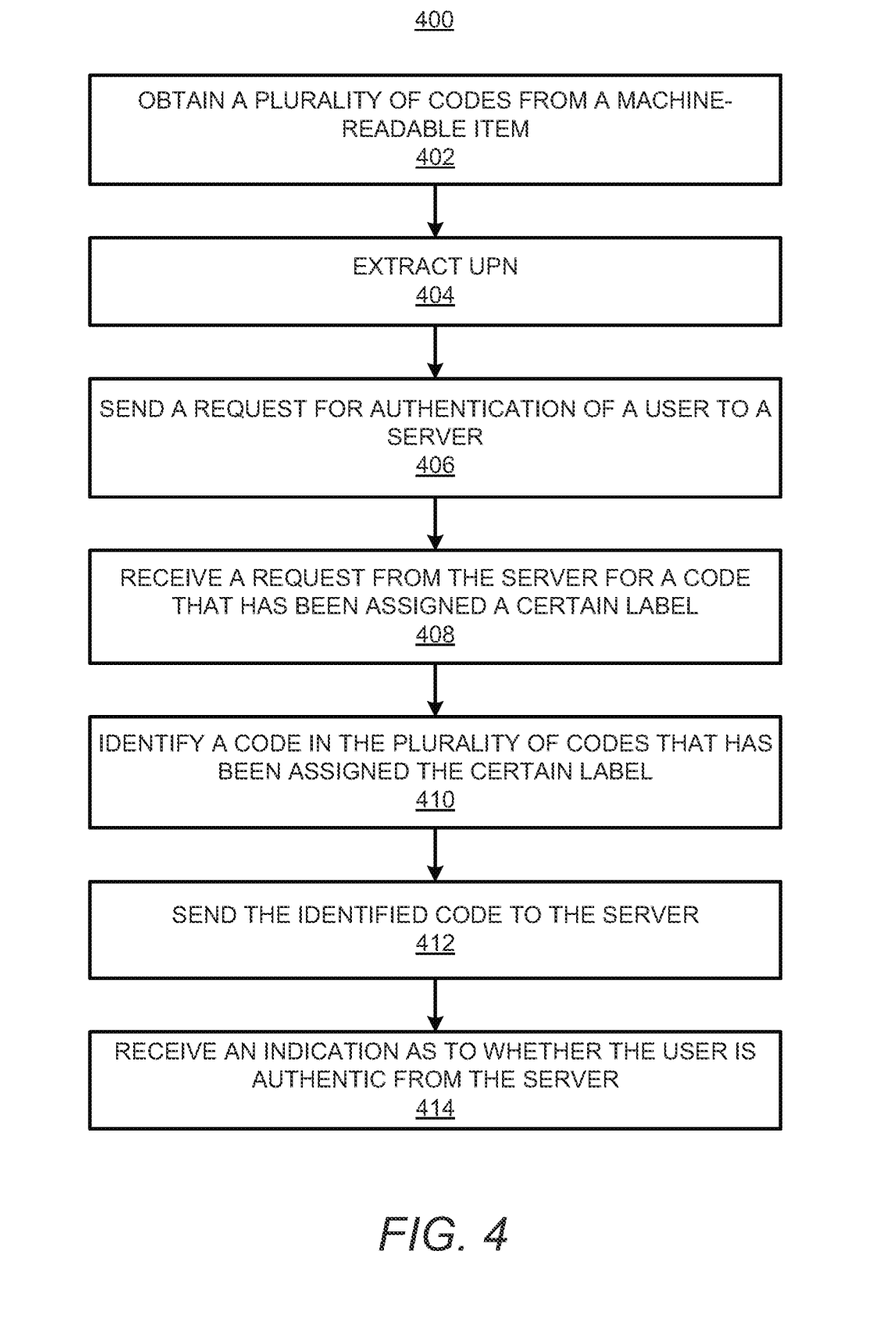
FIG. 4, depicts a flow diagram of a method for authenticating a user through use of codes contained in a machine-readable item, in accordance with an embodiment of the present disclosure.

Various manners in which the processor 104 of the apparatus 102 may operate are discussed in greater detail with respect to the method 400 depicted in FIG. 4. Particularly, FIG. 4 depicts a flow diagram of a method 400 for authenticating a user 130 through use of codes 134 contained in a machine-readable item 132, in accordance with an embodiment of the present disclosure. It should be understood that the method 400 depicted in FIG. 4 may include additional operations and that some of the operations described therein may be removed and/or modified without departing from the scope of the method 400. The description of the method 400 is made with reference to the features depicted in FIGS. 1-3B for purposes of illustration.

At block 402, the processor 104 is to obtain a plurality of codes 134 from a machine-readable item 132, in which each of the plurality of codes 134 is individually identifiable. For instance, each of the plurality of codes 134 is assigned with a locally unique label 302. In some examples, the plurality of codes 134 is embedded in a QR code and the machine-readable item 132 contains the QR code. In these examples, the processor 104 is to access an image of the QR code 134. In addition, the processor 104 is to determine the plurality of codes 134 from the accessed image of the QR code to obtain the plurality of codes 134 contained in the machine-readable item 132. In other examples in which the machine-readable item 132 is a data storage device, the processor 104 is to communicate with the machine-readable item 132 and to obtain the plurality of codes 134 from the machine-readable item 132 through the communication.

At block 404, the processor 104 is to extract the UPN 138 of the user 130 from the machine-readable item 132. The processor 104 may also obtain authentication information 136 from the user 130. At block 406, the processor 104 is to send a request to a server 120 for the user 130 of the machine-readable item 132 to be authenticated. The processor 104 is to send an identifier of the machine-readable item 132 and/or the user 130, e.g., the UPN 138, to the server 120 with the request. In some examples, the processor 104 may also send authentication information 136 with the request. In other examples, the processor 104 may send the authentication information 136 to the server 120 with the sending of the identified code 304 as discussed herein.

At block 408, the processor 104 is to receive a request from the server 120 for a code 304 that has been assigned a certain label 302. At block 410, the processor 104 is to identify a code 304 in the plurality of codes 134 that has been assigned the certain label 302. At block 412, the processor 104 is to send the identified code 304 to the server 120 for the server 120 to determine whether the user 130 is authentic based at least on the identified code 304 matching a certain code 129. In addition, at block 414, the processor 104 is to receive an indication as to whether the user 130 is authentic. The processor 104 may also grant or deny access by the user 130 to the apparatus 102 based on the indication.

Some or all of the operations set forth in the method 400 may be included as utilities, programs, or subprograms, in any desired computer accessible medium. In addition, the method 400 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 5:
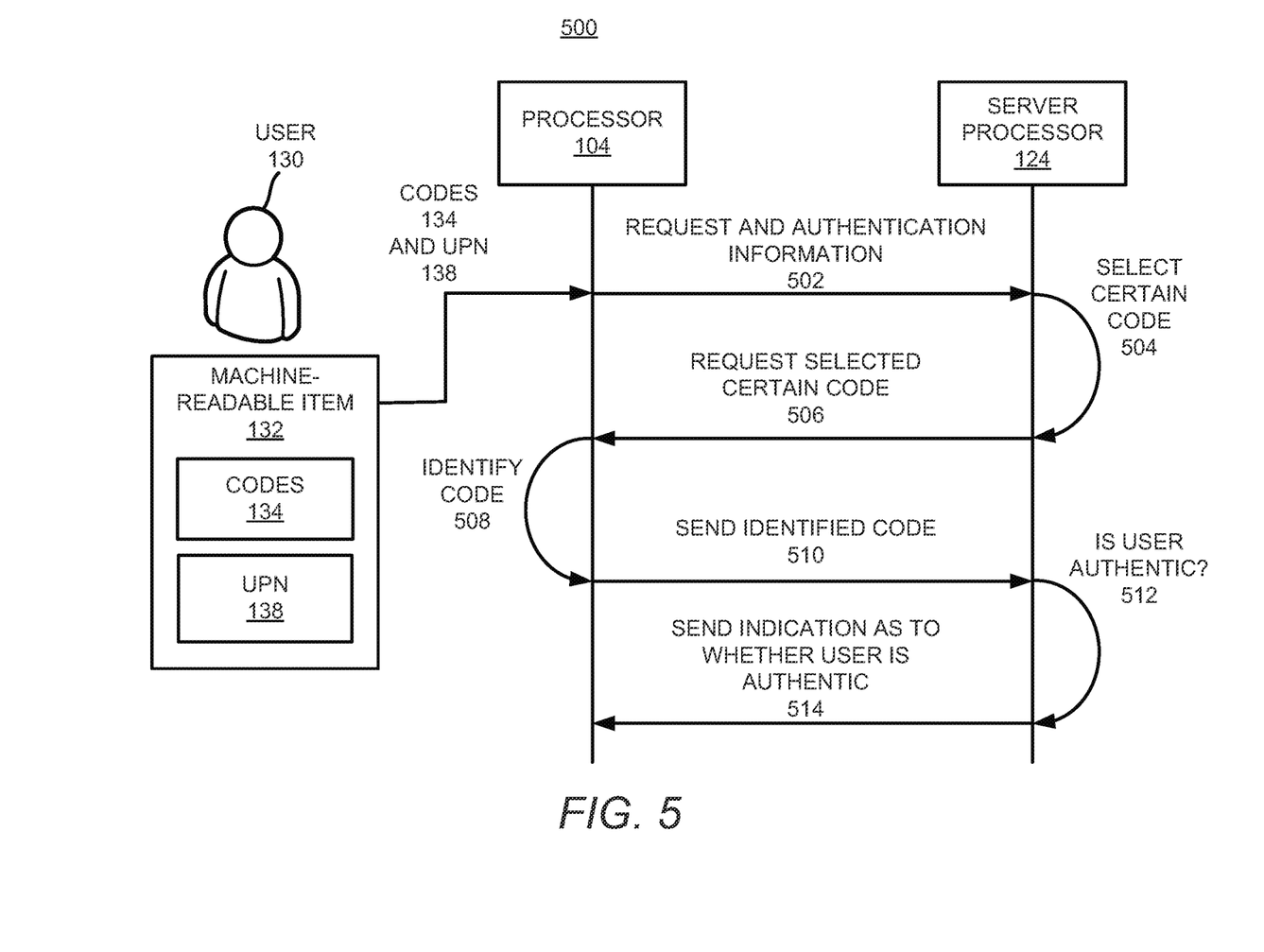
FIG. 5, depicts a flow diagram a flow diagram of a process for authenticating a user, in accordance with an embodiment of the present disclosure.

Turning now to FIG. 5, there is shown a flow diagram of a process 500 for authenticating a user 130, in accordance with an embodiment of the present disclosure. It should be understood that the authentication system 100 and the apparatus 102 of the authentication system 100 may include additional features and that some of the features described herein may be removed and/or modified without departing from the scopes of the authentication system 100 and/or the apparatus 102.

As shown in FIG. 5, the user 130 may initially access an application on the apparatus 102 that is to guide the user 130 in providing various inputs to be authenticated. For instance, the user 130 may open a sign-in application on the apparatus 102. In response to the sign-in application being opened, the processor 104 may cause a screen that provides the user 130 with certain sign-in options to be displayed on a display of or connected to the apparatus 102. The user 130 may select an option to sign-in using codes 134 assigned to the user 130, e.g., using a QR code 132 printed on the user's identification badge, using a QR code 132 displayed on the user's 130 smartphone, etc.

The processor 104 may cause an instruction for the user 130 to position the machine-readable item 132 adjacent to the apparatus 102 to be displayed on a display of the apparatus 102. In addition, the user 130 may supply the codes 134 to the processor 104 from the machine-readable item 132 by positioning the machine-readable item 132 adjacent to the apparatus 102 such that the reader 106 may read the codes 134 from the machine-readable item 132. The user 130 may also supply the user's UPN 138 to the processor 104 from the machine-readable item 132. For instance, the reader 106, which may include a camera, may capture an image of the machine-readable item 132, e.g., in instances in which the machine-readable item 132 is a QR code. In other examples, the reader 106 may wirelessly obtain the codes 134 and the UPN 138 from the machine-readable item 132 in instances in which the machine-readable item 132 is data storage device on which the codes 134 and the UPN 138 are stored as data.

In some examples, the processor 104 causes a screen that requests that the user 130 provide authentication information 136, such as a PIN, biometric information, a one-time code, etc., to be displayed on the display of the apparatus 102. The user 130 may supply the authentication information 136 to the apparatus 102 via the reader 106 or other device.

The processor 104 is to send 502 a request to the server processor 124 for the server processor 124 to determine whether the user 130 is authentic. Particularly, based on an instruction received from the user 130 for the user 130 to be authenticated, the processor 104 is to send the request to the server processor 124. The processor 104 may not include any of the codes 134 in the request. Instead, the processor 104 may include an identification of the user 130, e.g., the UPN 138, and/or the machine-readable item 132, e.g., a serial number, in the request sent to the server processor 124. In some examples, the processor 104 may also include the authentication information 136 in the request sent to the server processor 124.

The server processor 124 is to select 504 a certain code 129 from a plurality of certain codes 129 assigned to the machine-readable item 132 or the user 130. As discussed herein, the server processor 124 is to identify the certain codes 129 assigned to the machine-readable item 132 or the user 130 using the identification of the user 130 and/or the machine-readable item 132 included in the request received from the processor 104. Additionally, the server processor 124 is to select the certain code 129 to be a certain code that was previously not selected for the machine-readable item 132. That is, the server processor 124 is to only use a certain code 129 once for any machine-readable item 132.

The server processor 124 is to send 504 a request for the code that matches the selected certain code 129 to the processor 104. The processor 104 is to identify 508 the code 304 that matches the certain code 129 from the codes 134 received from the machine-readable item 132. Particularly, the request for the code that matches the selected certain code 129 includes a request for the code that has been assigned the same label as the selected certain code 129. In instances in which the codes 134 match the certain codes 129, the processor 104 is to identify the code 304 that matches the selected certain code 129. However, if the codes 134 do not match the certain codes 129, the likelihood that the code having the same label as the selected certain code 129 may be virtually zero.

The processor 104 is to send 510 the identified code 304 to the server processor 124. In addition, the server processor 124 is to determine 512 whether the user 130 is authentic. Particularly, the server processor 124 is to determine that the user 130 is authentic based at least on a determination that the identified code 304 matches the selected certain code 129. In some examples, the server processor 124 determines that the user 130 is authentic based on a determination that the identified code 304 matches the selected certain code 129 and the authentication information 136 matches stored authentication information for the user 130. However, the server processor 124 is to determine that the user 130 has not been authenticated based on a determination that the identified code 304 does not match the selected certain code 129 and/or that the authentication information 136 does not match the stored authentication information for the user 130.

The processor 104 is to send 514 an indication as to whether the user 130 is authentic to the processor 104. Based on the indication indicating that the user 130 is authentic, the processor 104 may permit the user 130 to access the apparatus 102. However, based on the indication indicating that the user 130 has not been authenticated, the processor 104 may not permit the user 130 to access the apparatus 102. In this instance, the processor 104 may perform another authentication operation.

Figure 6:
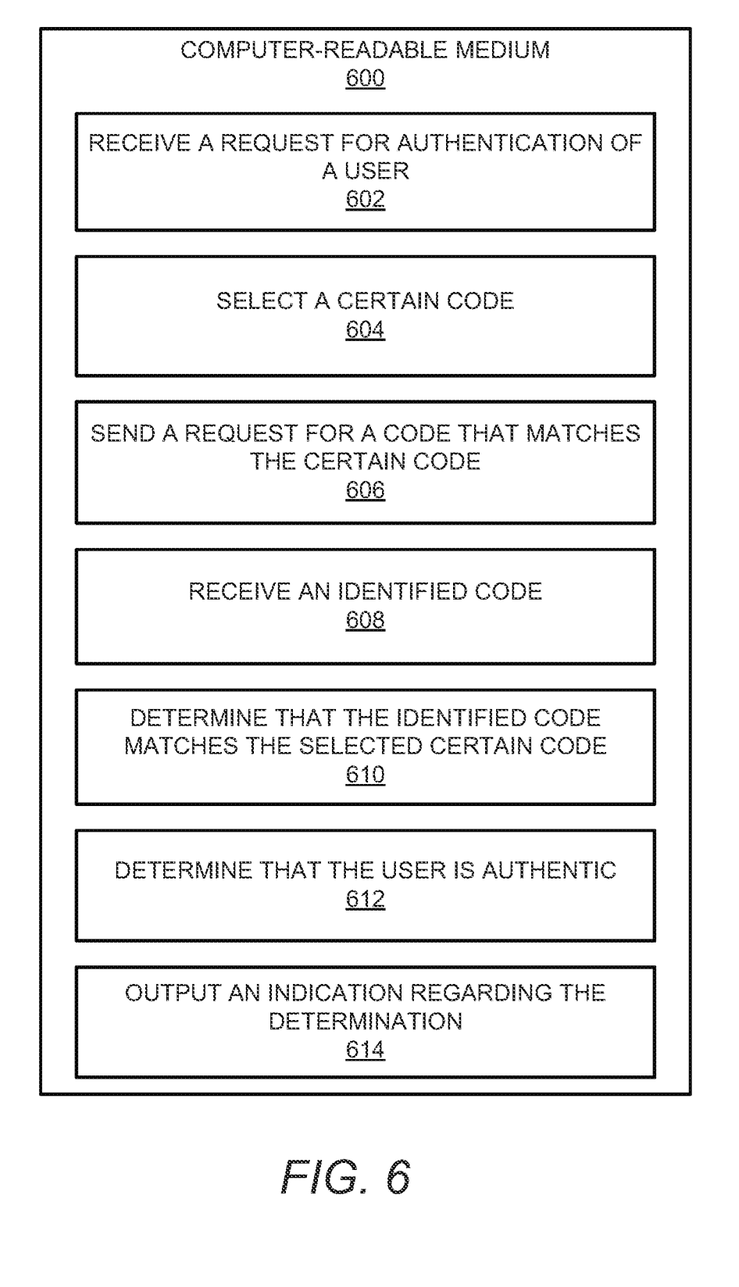
FIG. 6 shows a block diagram of a computer-readable medium that has stored thereon computer-readable instructions for determining whether a user is authentic and to output an indication that the user is permitted to access an apparatus responsive to a determination that the user is authentic, in accordance with an embodiment of the present disclosure.

Turning now to FIG. 6, there is shown a block diagram of a computer-readable medium 600 that has stored thereon computer-readable instructions for determining whether a user 130 is authentic and to output an indication that the user 130 is permitted to access an apparatus 102 responsive to a determination that the user 130 is authentic, in accordance with an embodiment of the present disclosure. It should be understood that the computer-readable medium 600 depicted in FIG. 6 may include additional instructions and that some of the instructions described herein may be removed and/or modified without departing from the scope of the computer-readable medium 600 disclosed herein. The computer-readable medium 600 may be a non-transitory computer-readable medium, in which the term "non-transitory" does not encompass transitory propagating signals.

The computer-readable medium 600 has stored thereon computer-readable instructions 602-614 that a processor, such as the server processor 124 depicted in FIG. 1, is to execute. The computer-readable medium 600 is an electronic, magnetic, optical, or other physical storage device that contains or stores executable instructions. The computer-readable medium 600 is, for example, Random Access memory (RAM), an Electrically Erasable Programmable Read-Only Memory (EEPROM), a storage device, an optical disc, and the like.

The processor is to fetch, decode, and execute the instructions 602 to receive a request from a client apparatus 102 for authentication of a user 130 of a machine-readable item 132 on which is contained a plurality of codes 134. The request from the client apparatus 102 may include a UPN 138 of the user 130. The processor is to fetch, decode, and execute the instructions 604 to select a certain code of a plurality of certain codes 129 associated with the plurality of codes 134 contained in the machine-readable item 132. The processor is to fetch, decode, and execute the instructions 606 to send a request for the selected certain code 129 to the client apparatus 102. Responsive to receipt of the request for the selected certain code 129, the client apparatus 102 is to identify a code 304 in the plurality of codes 134 that corresponds to the selected certain code 129 and to return the identified code 304. The processor is to fetch, decode, and execute the instructions 608 to receive the identified code 304 from the client apparatus 102.

The processor is to fetch, decode, and execute the instructions 610 to determine that the identified code 304 matches the selected certain code 129. The processor is to fetch, decode, and execute the instructions 612 to determine that the user 130 is authentic based at least on the identified code 304 matching the selected certain code 129. The processor is to fetch, decode, and execute the instructions 614 to output an indication regarding the determination Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a memory on which is stored machine-readable instructions that when executed by the processor, cause the processor to:
read a machine-readable item of a user to obtain a list of codes contained in the machine-readable item and extract an identifier of the machine-readable item;
send an authentication request, including the identifier of the machine-readable item, to a server for authentication of the user;
in response to the authentication request, receive, from the server, a request for a certain code, wherein the request includes a unique label of the certain code;
identify the certain code in the list of codes that corresponds to the unique label;
send the certain code to the server for the server to authenticate the user based at least on the certain code; and
receive, from the server, an indication as to whether the authentication request of the user is successful.

2. The apparatus of claim 1, wherein the list of codes is embedded in a quick response code and the machine-readable item contains the quick response code, and wherein the instructions cause the processor to:
access a captured image of the quick response code; and
determine the list of codes from the captured image of the quick response code to obtain the list of codes contained in the machine-readable item.

3. The apparatus of claim 1, wherein the instructions cause the processor to:
communicate with the machine-readable item through a wireless communication; and
obtain the list of codes from the machine-readable item through the wireless communication.

4. The apparatus of claim 1, wherein each code in the list of codes is assigned with an individually identifiable label.

5. The apparatus of claim 1, wherein the instructions cause the processor to:
extract a user principal name of the user from the machine-readable item; and
send the extracted user principal name of the user to the server for the server to authenticate the user also based on the extracted user principal name of the user.

6. The apparatus of claim 5, wherein the instructions cause the processor to:
send the extracted user principal name of the user to the server with the sending of the certain code.

7. The apparatus of claim 1, wherein the instructions cause the processor to:
obtain personal authentication information of the user, wherein the personal authentication information is tied to the list of codes and comprises one of a personal identification number, a one-time code, or biometric information of the user.

8. The apparatus of claim 7, wherein the instructions cause the processor to:
send the obtained personal authentication information of the user to the server with the sending of the authentication request for the server to select the certain code responsive to the obtained personal authentication information of the user being verified.

9. The apparatus of claim 1, wherein the instructions cause the processor to:
send the authentication request without sending any of the codes in the list of codes to the server.

10. A method comprising:
reading, by a processor, a machine-readable item of a user to obtain a list of codes contained in the machine-readable item and extract an identifier of the from a machine-readable item, each code in the list of codes being individually identifiable with a label;
sending, by the processor, an authentication request, including the identifier of the machine-readable item, to a server for authentication of the user;
in response to the authentication request, receiving, by the processor, a request from the server for a certain code, wherein the request includes a unique label of the certain code;
identifying, by the processor, the certain code in the list of codes that corresponds to the unique label;
sending, by the processor, the certain code to the server for the server to authenticate the user based at least on the certain code; and
receiving, by the processor, from the server, an indication as to whether the user is authentic.

11. The method of claim 10, wherein the list of codes is embedded in a quick response code and the machine-readable item contains the quick response code, the method further comprising:
accessing an image of the quick response code; and determining the list of codes from the accessed image of the quick response code to obtain the list of codes contained in the machine-readable item.

12. The method of claim 10, further comprising:
communicating with the machine-readable item through a wireless communication; and
obtaining the list of codes from the machine-readable item through the wireless communication.

13. The method of claim 10, further comprising:
extracting a user principal name of the user from the machine-readable item; and
sending the extracted user principal name of the user to the server with the sending of the authentication request for the server to select the certain code responsive to the extracted user principal name of the user being verified.

14. The method of claim 10, further comprising:
obtaining personal information of the user; and
sending the obtained personal information of the user to the server with the sending of the certain code.

15. The method of claim 10, further comprising:
sending the authentication request to the server for the user to be authenticated without sending the list of codes obtained from the machine-readable item.

16. A computer-readable storage medium storing instructions that when executed by a processor, cause the processor to:
read a machine-readable item of a user to obtain a list of codes contained in the machine-readable item and extract an identifier of the machine-readable item;
send an authentication request, including the identifier of the machine-readable item, to a server for authentication of the user;
in response to the authentication request, receive, from the server, a request for a certain code, wherein the request includes a unique label of the certain code;
identify the certain code in the list of codes that corresponds to the unique label;
send the certain code to the server for the server to authenticate the user based at least on the certain code; and
receive, from the server, an indication as to whether the authentication request of the user is successful.

17. The computer-readable storage medium of claim 16, wherein each code in the list of codes is assigned a uniquely identifiable label.

18. The computer-readable storage medium of claim 16, wherein the list of codes is embedded in a quick response code and the machine-readable item contains the quick response code, and wherein the instructions cause the processor to:
access a captured image of the quick response code; and
determine the list of codes from the captured image of the quick response code to obtain the list of codes contained in the machine-readable item.

19. The computer-readable storage medium of claim 16, wherein the instructions cause the processor to:
extract a user principal name of the user from the machine-readable item; and
send the extracted user principal name of the user to the server for the server to authenticate the user based also on the extracted user principal name of the user.

20. The computer-readable storage medium of claim 16, wherein the instructions cause the processor to:
obtain personal authentication information of the user, including a personal identification number, a one-time code, or biometric information of the user; and
send the obtained personal authentication information of the user to the server with the sending of the authentication request for the server to select the certain code responsive to the obtained personal authentication information of the user being verified.

* * * * *